(12) United States Patent
Kim

(10) Patent No.: US 8,080,208 B2
(45) Date of Patent: Dec. 20, 2011

(54) EXHAUST GAS PURIFICATION DEVICE

(75) Inventor: Chang Dae Kim, Yongin (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 269 days.

(21) Appl. No.: 12/357,953

(22) Filed: Jan. 22, 2009

(65) Prior Publication Data

US 2010/0058745 A1 Mar. 11, 2010

(30) Foreign Application Priority Data

Sep. 5, 2008 (KR) .................. 10-2008-0087821

(51) Int. Cl.
*F01N 3/10* (2006.01)
(52) U.S. Cl. .................. 422/177; 422/180; 422/211
(58) Field of Classification Search .................. 422/177, 422/180, 211; 60/299
See application file for complete search history.

(56) References Cited

U.S. PATENT DOCUMENTS

| | | | |
|---|---|---|---|
| 6,461,398 B2 * | 10/2002 | Peters et al. | 55/523 |
| 6,753,294 B1 * | 6/2004 | Brisley et al. | 502/439 |
| 7,107,763 B2 * | 9/2006 | Suwabe et al. | 60/295 |
| 2003/0140620 A1 * | 7/2003 | Shigapov et al. | 60/286 |
| 2004/0068971 A1 * | 4/2004 | Kuki et al. | 55/523 |
| 2004/0175315 A1 | 9/2004 | Brisley et al. | |
| 2004/0254073 A1 | 12/2004 | Wei et al. | |
| 2005/0044844 A1 | 3/2005 | Berriman et al. | |
| 2006/0057046 A1 * | 3/2006 | Punke et al. | 423/215.5 |

FOREIGN PATENT DOCUMENTS

| | | |
|---|---|---|
| DE | 10 2005 013 707 A1 | 9/2006 |
| EP | 0 736 503 A1 | 10/1996 |
| EP | 1 892 396 A1 | 2/2008 |
| FR | 2 849 670 A1 | 7/2004 |
| FR | 2 879 236 A1 | 6/2006 |
| JP | 2004-255377 A | 9/2004 |
| WO | WO 2007/034630 A1 | 3/2007 |

* cited by examiner

*Primary Examiner* — Jill Warden
*Assistant Examiner* — Joye L Woodard
(74) *Attorney, Agent, or Firm* — Morgan, Lewis & Bockius LLP

(57) ABSTRACT

An exhaust gas purification device that includes a catalytic particulate filter having at least an exhaust gas channel, the exhaust gas channel may include a first channel and a second channel being laterally coupled each other and fluidly communicating therebetween, wherein the exhaust gas is inlet through inlet opening of the first channel and outlet through lower portion of the first channel and/or outlet opening of the second channel, and wherein a first coating layer is formed on an interior surface of the first channel in a longitudinal direction thereof substantially from the inlet opening in a first predetermined length, the first coating layer being coated with a catalyst, and a second coating layer is formed on an interior surface of the second channel in a longitudinal direction thereof substantially from the outlet opening in a second predetermined length, the second coating layer being coated with the catalyst and a third coating is formed on an outside surface of a plug closing the outlet end of the first channel such that the second and third coating layers are connected.

5 Claims, 4 Drawing Sheets

FIG.4

|  | No$_2$ amount | Nox purification ratio |
|---|---|---|
| Conventional | 58 % | 56 % |
| This Invention | 68.1 % | 73.2 % |

< CPF soot Loading : 5 g/L >

EXHAUST GAS PURIFICATION DEVICE

CROSS-REFERENCE TO RELATED APPLICATION

The present application claims priority to Korean Patent Application No. 10-2008-0087821 filed in the Korean Intellectual Property Office on Sep. 5, 2008, the entire contents of which are incorporated herein for all purposes by this reference.

BACKGROUND OF THE INVENTION

1. Field of the Invention

The present invention relates to an exhaust gas purification device, and more particularly to an exhaust gas purification device in which a coating structure thereof is improved so as to sustain its normal purification efficiency.

2. Description of Related Art

Generally, the exhaust system of an engine exhausts exhaust gas to a rear of a vehicle and reduces exhaust noise.

Lately, a catalyst device has been used so as to purify the exhaust gas and transform harmful exhaust gas to harmless carbon dioxide and water.

Particularly, the catalyst device reduces hydrocarbon, carbon monoxide, and nitrogen oxide (NOx). Also, the catalyst device filters or burns particulate materials.

Generally, a catalyst filter mounted in the exhaust gas purification device has channels that are formed in a flow direction of the exhaust gas.

Further, the inlet of at least one among the channels is closed and the outlet thereof is opened, the inlet of at least another one among the channels is closed and the outlet thereof is opened, and the closed portions are alternatively disposed.

And, a catalytic particulate filter (CPF) among the catalyst devices is applied, wherein the particulate materials (PM) burn to be transformed to soot therein.

The soot is trapped and accumulated inside the catalytic particulate filter (CPF) such that the generating amount of NO2 is reduced and NOx purification efficiency of a selective catalyst reduction device is also reduced.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide an exhaust gas purification device having advantages of preventing a generation amount of NO2 from being reduced and improving NOx purification efficiency of a selective catalyst reduction device.

In an aspect of the present invention, an exhaust gas purification device that includes a catalytic particulate filter, in which a plurality of channels are formed in a flow direction of exhaust gas, inlet of at least one among the channels is closed and outlet thereof is opened, inlet of at least another one among the channels is closed and outlet thereof is opened, and the closed portions are alternatively disposed, may include a first coating layer of which a catalyst is coated to be formed on an interior surface of the channel in a direction from the inlet to the outlet as long as a predetermined first length, and/or a second coating layer of which the catalyst is coated to be formed on an exterior surface of the channel in a direction from the outlet to the inlet as long as a predetermined second length, wherein the catalyst is not coated on an interior surface of a downstream side of the channel.

The outlet of the channel may be closed by a plug, a third coating layer of which the catalyst is coated is formed in outside surface of the plug, and the third coating layer is connected to the second coating layer.

A selective catalytic reducing device (SCR) may be mounted at a downstream side of the catalytic particulate filter.

A reducing agent supply device may be mounted between the catalytic particulate filter and the selective catalytic reducing device.

A diesel oxidation catalyst device (DOC) may be disposed at an upstream side of the catalytic particulate filter.

In another aspect of the present invention, at an exhaust gas purification device that includes a catalytic particulate filter having at least an exhaust gas channel formed in a flow direction of exhaust gas, the exhaust gas channel may include a first channel and a second channel being laterally coupled each other and fluidly communicating therebetween through lateral contact surface thereof, wherein the exhaust gas is inlet through inlet opening of the first channel and outlet through lower portion of the first channel and/or outlet opening of the second channel, and wherein a first coating layer is formed on an interior surface of the first channel in a longitudinal direction thereof substantially from the inlet opening in a first predetermined length, the first coating layer being coated with a catalyst, and a second coating layer is formed on an interior surface of the second channel in a longitudinal direction thereof substantially from the outlet opening in a second predetermined length, the second coating layer being coated with the catalyst.

The first and second coating layers may not be overlapped each other.

The second coating layer may be further formed on an outer surface of the lower portion of the first channel in the longitudinal direction thereof substantially from a distal end portion thereof in the second predetermined length. The first and second coating layers may not be overlapped in each other.

The inlet opening of the first channel may be wider than a distal end portion of the first channel.

A distal end portion of the first channel may be closed. The distal end portion of the first channel may be closed by a plug. A third coating layer of which the catalyst is coated may be formed in outside surface of the plug.

The distal end portion of the first channel may be closed by a plug, a third coating layer of which the catalyst is coated may be formed in outside surface of the plug, and the third coating layer may be connected to the second coating layer.

A distal end portion of the second channel may be closed. The distal end portion of the second channel may be closed by a plug.

The outlet opening of the second channel may be narrower than a distal end portion of the second channel.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

BRIEF DESCRIPTION OF THE DRAWINGS

FIG. 4 is a table showing exhaust gas condition when a catalytic particulate filter according to an exemplary embodiment of the present invention is used.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Figure 1:
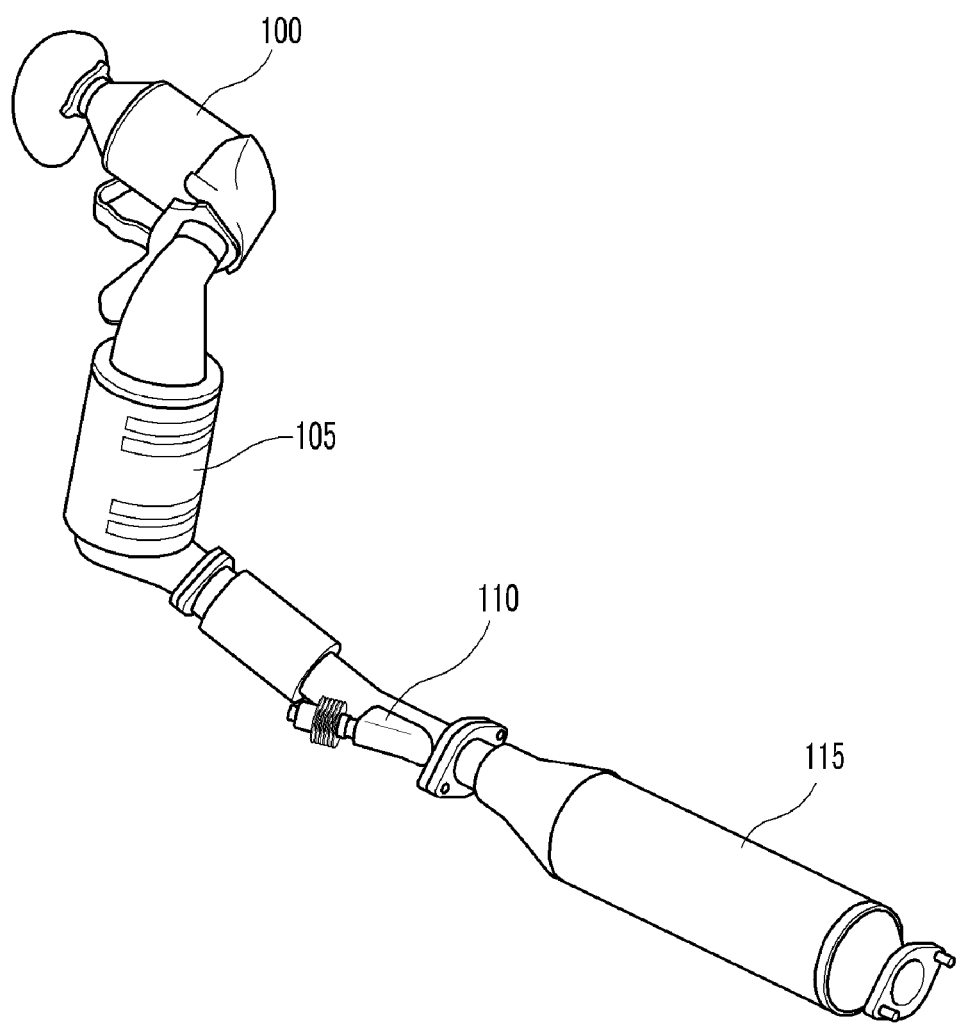
FIG. 1 is a perspective view of an exemplary exhaust gas purification device according to the present invention.

FIG. 1 is a perspective view of an exhaust gas purification device according to various embodiments of the present invention.

Referring to FIG. 1, an exhaust gas purification system includes a diesel oxidation catalyst device 100, a catalytic particulate filter 105, a reducing agent supply device 110, and a selective catalytic reducing device 115.

The diesel oxidation catalyst device (DOC) 100 is disposed at a downstream side of an engine so as to transform harmful gas (CO, THC, NOx, PM) to harmless gas (H2O, CO2).

Further, the catalytic particulate filter (CPF) 105 is disposed at a downstream side of the diesel oxidation catalyst device 100 so as to purify nitrogen oxide (NOx) and particulate matter (PM) including soot and smoke that is included in the exhaust gas.

And, the catalytic particulate filter 105 oxidizes NO to NO2 to also improve the performance of the selective catalytic reducing device (115, SCR).

Also, the reducing agent supply device (DM: dosing module) 110 injects a reducing agent (e.g., an urea aqueous solution) so as to reduce NOx, and the selective catalytic reducing device (115) uses the reducing agent to reduce nitrogen oxide (NOx). Herein, the structure and function of the purification devices 100, 105, 110, and 115 are well known to a person skilled in the art, so a detailed description thereof will be omitted.

The catalyst coating structure of the catalytic particulate filter 105 is improved to increase the NO2 amount in the exhaust gas and to improve the function of the selective catalytic reducing device 115 and purifying rate of the nitrogen oxide (NOx).

Further, the improved coating structure of the catalytic particulate filter 105 sustains the purification efficiency, even though the soot and smoke is accumulated in the filter. The interior structure of the catalytic particulate filter 105 will be explained referring to FIG. 2.

Figure 2:
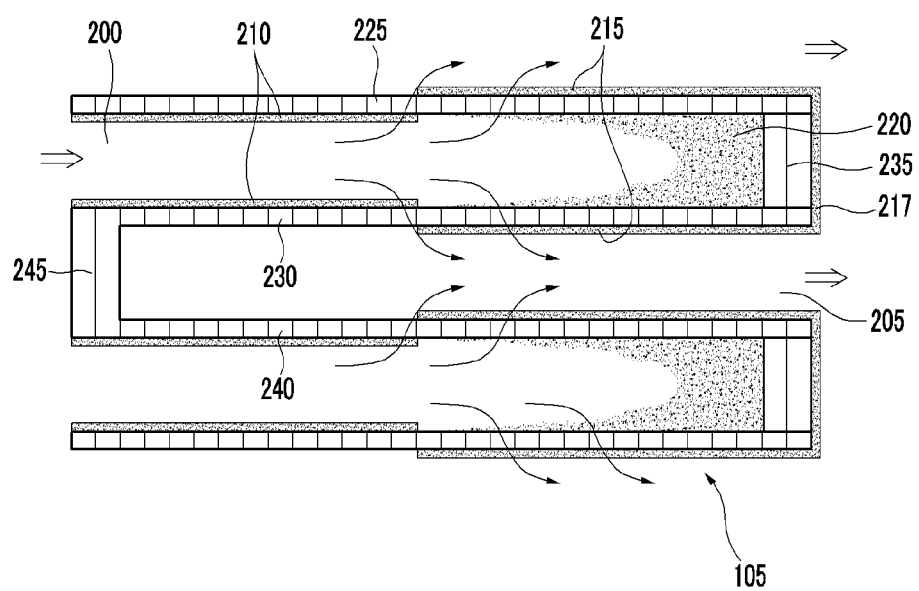
FIG. 2 is a partial sectional detailed view of an exemplary catalytic particulate filter (CPF) according to the present invention.

FIG. 2 is a partial sectional detailed view of a catalytic particulate filter (CPF) according to various embodiments of the present invention.

Referring to FIG. 2, the catalytic particulate filter 105 includes a first cell plate 225, a second cell plate 230, and a third cell plate 240 that are sequentially disposed from an upper portion to a lower portion to face each other.

In various embodiments of the present invention, the channel section shape of the catalytic particulate filter can be formed as a square, a hexagon, a circle, a triangle, and so on.

Accordingly, the first and second cell plates 225 and 230 constitute the first channel of the catalytic particulate filter; the second and third cell plates 230 and 240 constitute the second channel of the catalytic particulate filter. This embodiment of the present invention is only an example and can be varied in a variety of types.

An inlet 200 through which the exhaust gas flows into is formed in a front portion of the first and second cell plates 225 and 230, and plugs 245 and 235 are respectively disposed at the front portion of the second channel and the rear portion of the first channel.

The exhaust gas flows into the channel that is formed between the first and second cell plates 225 and 230 through the inlet 200, moves from the left to the right in the drawing, penetrates the first and second cell plates 225 and 230, passes the outside path of the first cell plate 225 or the outside path of the second cell plate 230, and is discharged through the outlet 205.

A first coating layer 210, in which catalyst is coated, is formed on the interior surface of the first and second cell plates 225 and 230, and the first coating layer 210 is formed in a direction from the inlet 200 to the plug 235 as long as a predetermined length. Further, a coating layer is not formed at a downstream side of the interior of the first and second cell plates 225 and 230.

When the catalytic particulate filter 105 is operating, the soot and smoke (220) are trapped at a downstream side of the channel interior, wherein the catalyst is not coated at a downstream side of the interior surface of the channel such that the catalyst function is not deteriorated.

Further, in various embodiments of the present invention, a second coating layer 215, on which catalyst is coated, is formed at a downstream side of the exterior surface of the first cell plate 225 and the second cell plates 230.

The exhaust gas flows along the interior path at an upstream side of the channel that is formed between first and second cell plates 225 and 230, penetrates the first and second cell plates 225 and 230, and flows along the exterior path of the first and second cell plates 225 and 230 as it goes to the downstream portion such that the second coating layer 215 efficiently purifies the exhaust gas.

Also, in various embodiments of the present invention, a third coating layer 217, in which catalyst is coated, is further formed at the outside surface of the plug 235 to substantially improve the efficiency of the catalyst. As shown in FIG. 2, it is desirable that the second coating layer 215 and the third coating layer 217 are connected to each other.

Referring to FIG. 2, some channels of the catalytic particulate filter (CPF) are opened in one direction, and others are opened in the other direction.

Also, the inlet and the outlet of the channels are alternatively closed by the plugs, the entire section thereof has a check pattern, and the exhaust gas penetrates through the cell plate (cell wall).

Accordingly, particulate materials (PM) are trapped at the cell plate (cell wall) of the channel inside, and the exhaust gas is oxidized or reduced by the catalyst coating layer to be transformed to the harmless material and flows to a downstream side of the channel.

However, as the particulate material is increased, the flow resistance of the exhaust gas is increased. The particulate materials are burned at time intervals to be eliminated so as to resolve the problem.

Most of the filters in the catalytic particulate filters are a honeycomb type, and the type can be varied according to design specifications.

In various embodiments of the present invention, opening of the inlet 200 may be wider than the inner portion the plug 235 is disposed. In this configuration the flow resistance of the exhaust gas at the upstream side of the catalytic particulate filter 105 may be increased since the pressure at the middle portion of the channel is increased so that the contact time period of the exhaust gas with the first coating layer 210 at the upstream side thereof may be elongated.

In other exemplary embodiments of the present invention, opening of the outlet 206 may be narrower than the inner portion the plug 245 is disposed. In this configuration the flow resistance of the exhaust gas at the downstream side of the catalytic particulate filter 105 may be increased so as to elongate the contact time period of the exhaust gas with the second coating layer 215.

Figure 3:
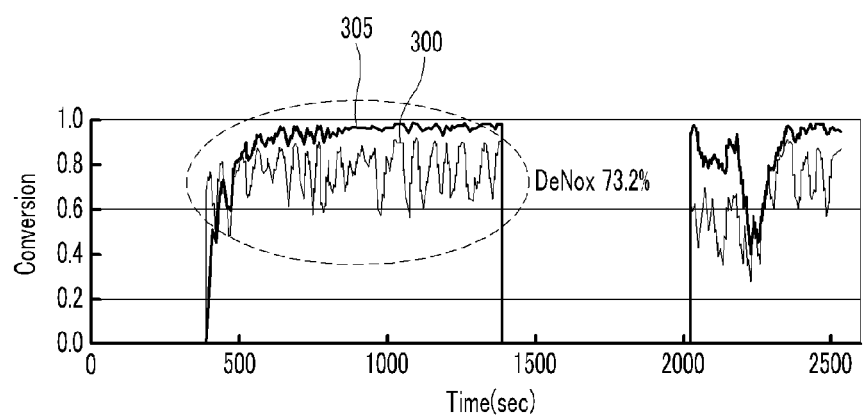
FIG. 3 is a graph showing exhaust gas condition at an exemplary downstream side of catalytic particulate filter according to the present invention.

FIG. 3 is a graph showing exhaust gas condition at a downstream side of the catalytic particulate filter according to various embodiments of the present invention.

Referring to FIG. 3, the horizontal axis shows driving time and the vertical axis shows changing rate, wherein the NO2 generating amount 305 of the downstream side of the catalytic particulate filter 105 and the NOx purifying rate 300 of the selective catalytic reducing device 115 are graphed.

As shown, the NO2 generating amount 305 that is supplied to the selective catalytic reducing device 115 is uniformly sustained so that the NOx purifying rate 300 can be uniformly maintained.

In various embodiments of the present invention, the catalyst amount that is used in the catalytic particulate filter 105 is not increased and the NO2 generating amount 305 is maintained in a condition in which the soot 220 is trapped in the channel such that the effect thereof is demonstrated.

FIG. 4 is a table showing exhaust gas condition when using a catalytic particulate filter according to various embodiments of the present invention.

Referring to FIG. 4, it shows that the NO2 generation rate increases by 10% and the NOx purification efficiency increase by more than 15% in a condition in which the soot 220 is trapped in various embodiments of the present invention.

In various aspects of the present invention, although the soot is accumulated at a downstream side of the inside surface of the channel of the catalytic particulate filter, the coating area of the catalyst is not reduced such that the generation amount of NO2 is not reduced and the purification efficiency of NOx is improved in the exhaust gas purification device according to the present invention. Further, since the catalyst is coated at a downstream side of the outside surface of the channel instead of being coated at a downstream side of the inside surface of the channel, so the generation of NO2 is not reduced and the purification efficiency of NOx is improved.

For convenience in explanation and accurate definition in the appended claims, the terms "upper", "lower", "front", "rear", "interior", and "exterior" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An exhaust gas purification device that includes a catalytic particulate filter, in which a plurality of channels are formed in a flow direction of exhaust gas, an inlet of at least one channel among the channels is open and an outlet thereof is closed, an inlet of at least another one channel among the channels is closed and an outlet thereof is open, and the closed portions are alternatively disposed, the exhaust gas purification device comprising:

a first coating layer containing a catalyst formed on an interior surface of the at least one channel in a direction from the inlet to the outlet of the at least one channel as long as a predetermined first length; and a second coating layer containing the catalyst formed on an exterior surface of the at least one channel in a direction from the outlet to the inlet of the at least one channel as long as a predetermined second length, wherein the catalyst of the first and second coating layer is not coated on an interior surface of a downstream side of the at least one channel;

wherein the outlet of the at least one channel is closed by a plug;

wherein a third coating layer containing the catalyst is formed on an outside surface of the plug; and wherein the third coating layer is connected to the second coating layer.

2. The exhaust gas purification device of claim 1, wherein a selective catalytic reducing device (SCR) is mounted at a downstream side of the catalytic particulate filter.

3. The exhaust gas purification device of claim 2, wherein a reducing agent supply device is mounted between the catalytic particulate filter and the selective catalytic reducing device.

4. The exhaust gas purification device of claim 3, wherein a diesel oxidation catalyst device (DOC) is disposed at an upstream side of the catalytic particulate filter.

5. The exhaust gas purification device of claim 1, wherein the first and second coating layers do not overlap each other along the length of the first and second channels.

* * * * *